Patented Feb. 20, 1940

2,190,715

UNITED STATES PATENT OFFICE 2,190,715

EXTREME PRESSURE LUBRICANT

Samuel Edward Jolly and John Harold Perrine, Prospect Park, Pa., assignors to Sun Oil Company, Philadelphia, Pa., a corporation of New Jersey No Drawing. Application January 16, 1937
Serial No. 120,935

13 Claims. (Cl. 87—9)

An extreme pressure lubricant differs from the ordinary lubricant in that it lubricates bearings in action under very high pressures without the bearings being "seized" and thus rendered useless. When "seizure" takes place the bearings cease to function smoothly and they are gouged or roughened. When tested with the Almen machine, an ordinary hydrocarbon lubricating oil "seizes" when a pressure of about 3,000 or 4,000 pounds per square inch is applied. To meet modern requirements, as, for example, in the automotive industry, it is necessary to provide lubricants which will avoid "seizure" when the Almen machine is operated under a pressure not less than 15,000 pounds and that the torque, at that pressure, should not exceed 45 foot pounds.

It is known that when certain materials, in proportions varying from one to five per cent., are added to ordinary lubricating oils, such oils will be converted into high pressure lubricants. Some of them, however, when tested with the Almen machine, will "seize" at a considerably lower pressure than 15,000 pounds. One or more of them, however, are capable of passing through the Almen machine at a pressure of 15,000 pounds with a torque below 40 foot pounds, but when run in a transmission for 24 hours the lubricant loses its extreme pressure quality; in other words, it has no permanency as an extreme pressure lubricant under conditions of actual use.

Besides imparting to ordinary lubricating oil the property of withstanding pressures not less than that above specified and enabling the oil to retain such property for a period of running time approximating that expected and required of ordinary lubricating oil in actual commercial use, the added materials, in order to be unobjectionable and secure high efficiency in connection with their employment, must possess the following properties:

They must be completely and readily soluble in the hydrocarbon lubricant to which they are added and they must not change the natural appearance of such lubricant.

They must not be soluble in water or react with water at ordinary atmospheric temperature. They must not be volatile when the oil heats up to a temperature of about 150° C. at 760 mm.

They must not attack or corrode the metal bearings.

At a pressure of 15,000 pounds, the torque must not exceed 45 foot pounds.

Under the conditions of actual operation, when high pressures and temperatures are attained, they must not react with the lubricating oil or be themselves decomposed when heated to a temperature of approximately 150° C.

To satisfy the property of permanency, the lubricant must maintain its efficiency when used in a transmission operated continuously for a period of 100 hours at a temperature of approximately 125° C., which satisfies the conditions of actual operation.

Extreme pressure lubricants embodying our invention possess all the properties above enumerated and are believed, therefore, to satisfy every requirement for an extreme pressure lubricant.

After preparing and testing more than 400 different compounds, we have discovered that when either normal propyl benzene or iso propyl benzene is treated with phosphorus trichloride, in the presence of aluminum chloride as a catalyst, a product or products are obtained which fulfill all of the requirements demanded of a compound which, when added to ordinary lubricating oil to the extent of less than 3 percent converts it into an extreme pressure lubricant having all the properties above specified.

We have also discovered that when any of the butyl benzenes are treated with phosphorus trichloride, in the presence of aluminum chloride as a catalyst, products are obtained which, when added to ordinary lubricating oils to the extent of less than 3 percent, converts such lubricating oil into an extreme pressure lubricant having all the properties above specified.

In preparing these compounds we proceed as follows, using proply benzene as an example.

The reaction vessel is made of glass or of porcelain-lined metal or of aluminum or of any alloy which will not react with the hydrochloric acid evolved to form reaction products which might act as deleterious catalysts. (Although aluminum reacts with hydrochloric acid, the resulting aluminum chloride is a desirable catalyst.)

The reaction vessel is provided with a mechanical stirrer, an inlet, an outlet, and a condenser. The propyl benzene is run into the reaction vessel and for each kilogram of propyl benzene employed about 20 grams of anhydrous aluminum chloride is added. Then phosphorus trichloride is slowly introduced, the amount being about one mole for each mole of propyl benzene used. The reaction starts at once, heat is generated, and hydrochloric acid is evolved through the top of the condenser and absorbed in water. After the preliminary reaction has subsided, the vessel is heated until no more hydrochloric acid is evolved (24 to 48 hours). Any unreacted propyl benzene and any unreacted phosphorus trichloride are removed by distillation. Two separate layers remain in the reaction vessel. The top layer, consisting of the reacted products (other than the catalytic complex which remains in the bottom), is fractionated, under diminished pressure, and a final cut is collected between about 100° C. and about 155° C. at 20 mm. The resulting product, consisting largely of propyl benzene dichlor phosphine, may be further purified, if desired, by fractional distillation. The pure (iso) compound boils at 268°–270° C. at 760 mm. of mercury or at about 140°–150° C. at 20 mm. of mercury. The crude product may be efficiently employed as produced, or it may be further purified by redistillation, as above indicated, and then washed with water in order to remove the last traces of hydrochloric acid. The product is readily soluble in hydrocarbon oils and is insoluble in water and is not decomposed by water at ordinary atmospheric temperature. It is soluble in ethyl alcohol, benzene, carbon, tetrachloride, and acetone. It is stable at its boiling point The tar-like catalytic complex remaining in the bottom of the reaction vessel may be treated with cold water, a small amount of water being added at a time. The reaction between the water and the catalytic complex is quite vigorous. After the decomposition has been effected, a dark colored tarry mass separates on top of the water. This is washed several times with water, dried, and finally distilled, under a partial vacuum. A cut taken between about 100° C. and about 155° C. at 20 mm. proved to be composed principally of propyl benzene dichlor phosphine.

Each of the above distillates, boiling between about 100° C. and about 155° C. at 20 mm., consisting of the crude products, may be efficiently used, after washing with water, without further purification.

Instead of breaking down the tar-like catalytic complex and recovering the potent materials from it as above described, it is practicable, and perhaps preferable, to continue carrying on the process by utilizing it as a catalyst, instead of the anhydrous aluminum chloride; and it will be understood that in our process the two catalysts are equivalents.

Butyl benzene dichlor phosphine may be prepared by substituting butyl benzene for propyl benzene and proceeding in the manner above described for the preparation of propyl benzene dichlor phosphine. The crude butyl product boils between about 110° C. and about 170° C. at 20 mm., corresponding to a boiling point of from about 220° C. to about 290° C. at 760 mm. It is readily soluble in hydrocarbon oils and is insoluble in and not decomposed by water. It is soluble in ethyl alcohol, benzene carbon tetrachloride, and acetone. It is relatively stable at its boiling point.

In the preparation of either propyl benzene dichlor phosphine or butyl benzene dichlor phosphine, there are formed minor proportions of other compounds of varying boiling points that are derivatives of phosphine. Thus, in the preparation of propyl benzene dichlor phosphine, there are formed propyl benzene monochlor phosphine and particularly dipropyl benzene monochlor phosphine, and possibly tripropyl benzene phosphine and phosphine. So in the preparation of isomeric butyl benzenes there are formed corresponding compounds. Due to the formation of decomposition products by the action of anhydrous aluminum chloride on the alkylated benzenes, and due to the formation of varying minor amounts of the compounds above named, the boiling points of the products vary over a wide range. In claiming propyl benzene or butyl benzene, we mean to include all of the possible isomeric compounds included under each term. Propyl benzene dichlor phosphine and butyl benzene dichlor phosphine comprise all substances of a class which is definable as alkyl benzene dichlor phosphine in which the alkyl group contains from three to four carbon atoms; and in those claims wherein the lubricant is defined as containing alkyl benzene dichlor phosphine in which the alkyl group contains from three to four carbon atoms, such term is intended to include only propyl benzene dichlor phosphine and butyl benzene dichlor phosphine. So also mono propyl benzene and mono butyl benzene comprise all substances of a class which is definable as mono-alkylated benzene in which the alkyl group contains from three to four carbon atoms; and in those claims wherein the lubricant is defined as containing a minor percentage of the reaction products of mono alkylated benzene, in which the alkyl group contains from three to four carbon atoms, when reacted as described, we mean to include only the reaction products of mono propyl benzene and mono butyl benzene.

The percentage of any of the described compounds which must be added to ordinary lubricating oil to convert it into a high pressure lubricant cannot be arbitrarily stated, since a percentage substantially less than that required to secure high efficiency will impart to the oil the properties desired to a material extent. Generally speaking, the percentage added should not be less than 1½ percent. Between 2 and 3% will impart to the oil the desired qualities in maximum degree, and while this larger proportion may be materially exceeded, the excess will have no beneficial effect.

In order to determine the durability of these products, when dissolved in lubricating oils and employed under actual conditions of use, tests were made in a transmission removed from a 1936 Chevrolet car. The transmission was mounted on a frame and connected to a shaft of a motor running at a speed of 1725 R. P. M. Two and one-half percent, by weight, of the product (e. g. propyl benzene dichlor phosphine) was dissolved in ordinary lubricating oil having a viscosity of 160. The oil was placed in the transmission and heated, by means of an electric thermostatically controlled resistance, to a temperature of 120° C. This temperature was maintained throughout the entire run. The motor was started and the transmission run continuously for a period of 100 hours. Samples were removed for testing after every 24 hours during the run. During this 100 hour test the shaft revolved 10,350,000 times. Upon completion of the 100 hour run, samples of the oil were removed and passed through the Almen machine at a pressure of 15,000 pounds per square inch, and the torque was below 45 foot pounds. The same test, with the same result, was made with the same lubricating oil containing two and one-half percent of butyl benzene dichlor phosphine. Thus, conclusive evidence was afforded of the lasting properties of the compounds mentioned, under conditions of actual employment.

A careful examination of the gears of this transmission, before and after these runs, indicated that no corrosion took place when the two products, above mentioned, were employed. Marked corrosion was noted after various other products were used.

We have found that, if lard oil, or the acids obtained by the oxidation of paraffin wax (which in our composition are the equivalent of lard oil) are added to the composition above described, an additional "oiliness" is imparted to the lubricant and that the torque, under high pressures, is lower than when the lard oil or the above mentioned acids are absent. The addition of as little as one percent of either of these ingredients has an appreciable effect of the character specified, but we prefer to add about five percent, which is effective to notably improve the product in the respect mentioned. The addition of a larger proportion, up to or even, possibly, above ten percent, is permissible, but effects no marked improvement over that secured by the addition of the preferred percentage mentioned and is objectionable on account of the added expense.

What we claim and desire to protect by Letters Patent is:

1. An extreme pressure lubricant comprising lubricating oil containing a minor percentage of alkyl benzene dichlor phosphine in which the alkyl group contains from three to four carbon atoms.

2. An extreme pressure lubricant comprising lubricating oil containing a minor percentage of propyl benzene dichlor phosphine.

3. An extreme pressure lubricant comprising lubricating oil containing a minor percentage of butyl benzene dichlor phosphine.

4. An extreme pressure lubricant comprising lubricating oil containing a minor percentage of the reaction products of mono alkylated benzene, in which the alkyl group contains from three to four carbon atoms, reacted with phosphorous trichloride in the presence of aluminum chloride as a catalyst.

5. An extreme pressure lubricating oil comprising lubricating oil containing a minor percentage of the reaction products of mono propyl benzene reacted with prosphorus trichloride in the presence of aluminum chloride as a catalyst.

6. An extreme pressure lubricating oil comprising lubricating oil containing a minor percentage of the reaction products of mono butyl benzene reacted with phosphorus trichloride in the presence of aluminum chloride as a catalyst.

7. An extreme pressure lubricant in accordance with claim 4 which will not corrode metallic bearings, which is insoluble in water, which is relatively stable at the temperatures and pressures encountered during the operation of high pressure bearings and whose extreme pressure properties will, therefore, not decrease with extended use.

8. An extreme pressure lubricant in accordance with claim 5 which is insoluble in water, which is relatively stable at the temperatures and pressures encountered during the operation of high pressure bearings and whose extreme pressure properties will, therefore, not decrease with extended use.

9. An extreme pressure lubricant comprising lubricating oil containing a minor percentage of the reaction products of mono alkylated benzene, in which the alkyl group contains from three to four carbon atoms, reacted with phosphorus trichloride in the presence of aluminum chloride as a catalyst, and containing also a small percentage of lard oil.

10. An extreme pressure lubricating oil comprising lubricating oil containing a minor percentage of the reaction products of mono propyl benzene reacted with phosphorus trichloride in the presence of aluminum chloride as a catalyst, and containing also a small percentage of lard oil.

11. An extreme pressure lubricating oil comprising lubricating oil containing a minor percentage of the reaction products of mono butyl benzene reacted with phosphorus trichloride in the presence of aluminum chloride as a catalyst, and containing also a small percentage of lard oil.

12. An extreme pressure lubricant comprising lubricating oil containing a minor percentage of alkyl benzene dichlor phosphine in which the alkyl group contains from three to four carbon atoms, and containing also a small percentage of lard oil.

13. An extreme pressure lubricant in accordance with claim 6 which is insoluble in water, which is relatively stable at the temperatures and pressures encountered during the operation of high pressure bearings and whose extreme pressure properties will, therefore, not decrease with extended use.

SAMUEL EDWARD JOLLY.
JOHN HAROLD PERRINE.